United States Patent [19]

Stepan

[11] Patent Number: 5,111,720
[45] Date of Patent: May 12, 1992

[54] ROTARY WIRE STRIPPER

[76] Inventor: Jiri Stepan, Sargans, Switzerland

[21] Appl. No.: 619,720

[22] Filed: Nov. 29, 1990

Related U.S. Application Data

[63] Continuation of Ser. No. 449,545, Dec. 12, 1989, Pat. No. 4,981,054, which is a continuation of Ser. No. 183,782, Apr. 20, 1988, Pat. No. 4,920,830, which is a continuation of Ser. No. 832,463, Feb. 21, 1986, Pat. No. 4,745,828.

[30] Foreign Application Priority Data

Feb. 22, 1985 [CH] Switzerland .................. 815/85

[51] Int. Cl.⁵ ............................... H02G 1/12
[52] U.S. Cl. ........................... 81/9.51; 81/9.42
[58] Field of Search .............. 81/9.4, 9.41, 9.42, 81/9.43, 9.44, 9.51; 29/564.4; 30/90.1, 91.2

[56] References Cited

U.S. PATENT DOCUMENTS 2,645,959  7/1953  Fuchs et al.
3,881,374  5/1975  Gudmestad
4,345,362  8/1982  de Givry
4,546,675  10/1985  Okada et al.

FOREIGN PATENT DOCUMENTS 7734574  11/1977  France.

OTHER PUBLICATIONS

AMP Customer Manual, AMP Incorporated, Harrisburg, PA 17105, Copyright 1980, 1981 and 1982.

Primary Examiner—D. S. Meislin
Attorney, Agent, or Firm—Ostrolenk, Faber, Gerb & Soffen

[57] ABSTRACT

A device for the mechanical stripping of at least two layers of elecrtrical or optical cables has a stop for a fed-in conductor. The conductor is fixed in position by clamping jaws, whereupon its insulation can be severed by at least one rotating stripping blade. Disposed immediately next to each blade is a centering jaw, which centers the conductor. The jaw is radially movable relative to the blade so as to permit the penetration of the blade into the layer of insulation. The blades and the centering jaws are positioned axially and the desired cutting depth of each of at least two stripping operations is adjusted by spindles, each of which is operated by a motor which is controlled by a digital controller.

31 Claims, 3 Drawing Sheets

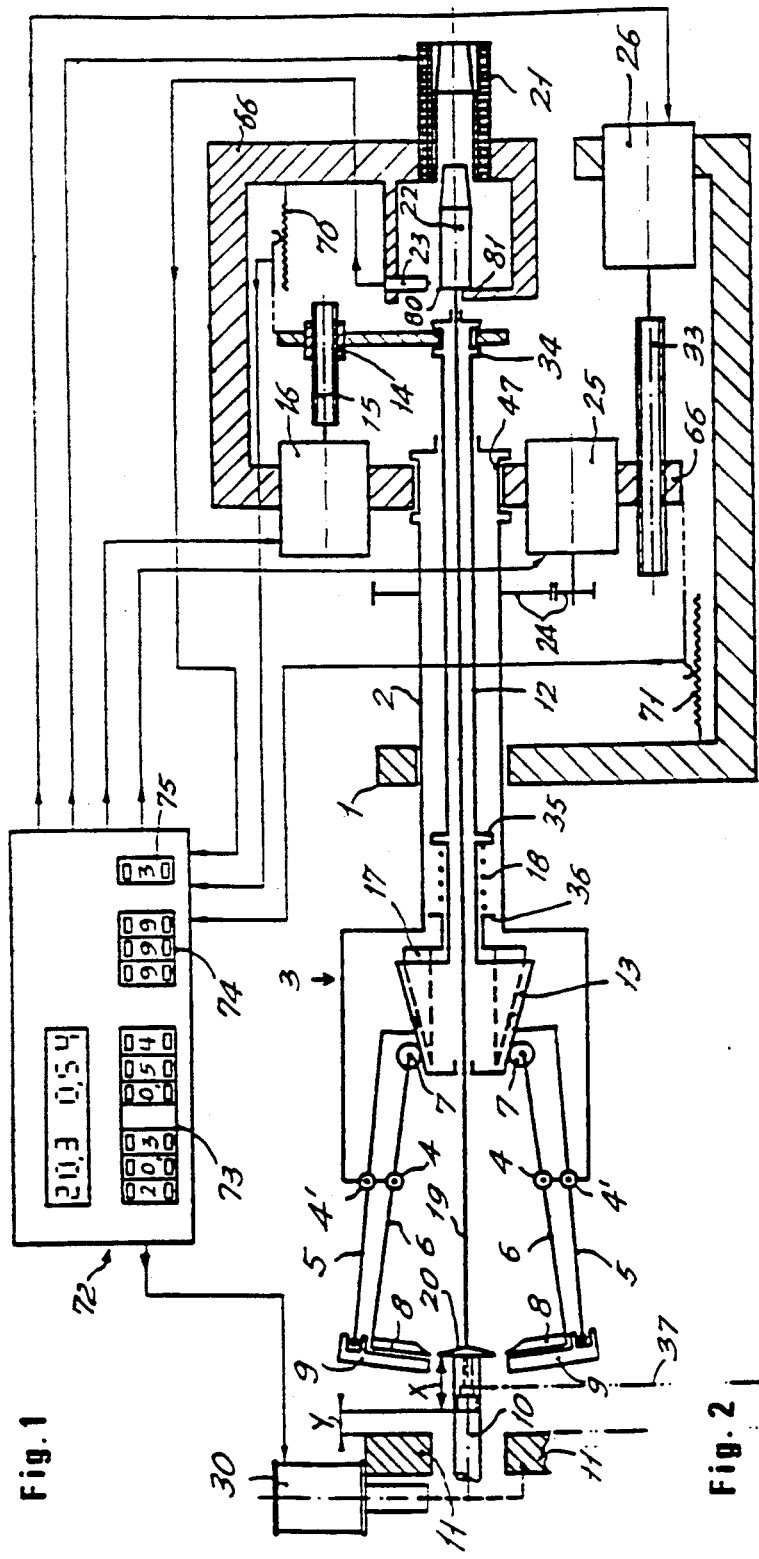
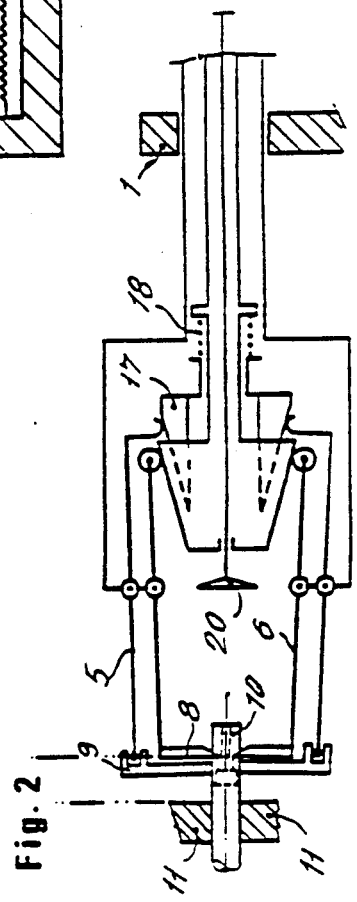
Fig. 1
Fig. 2

ROTARY WIRE STRIPPER

CROSS-REFERENCE TO RELATED APPLICATION

This is a continuation of application Ser. No. 07/449,545, filed Dec. 12, 1989, now U.S. Pat. No. 4,981,054, which is a continuation of Ser. No. 07/183,782, filed Apr. 20, 1988, now U.S. Pat. No. 4,920,830, which is a continuation of U.S. patent application Ser. No. 06/832,463 filed Feb. 21, 1986, now U.S. Pat. No. 4,745,828.

BACKGROUND OF THE INVENTION

This invention relates, generally, to a wire stripper, and more particularly to a wire stripper having rotary cutting blades. From U.S. Pat. No. 3,881,374 (Gudmestad) it is known to provide centering jaws having a prismatic holding surface into which the blade, which is firmly joined with the centering jaws, projects. The centering jaws are arranged in front of the blade as viewed from the end of the conductor. However, such a construction has disadvantages in that it can be adjusted only for a single conductor diameter and for stripping a single layer of material. Further, it must be readjusted for other diameters and/or each further stripping operation in a complicated manner. Further, the prismatic surfaces render the use of the device for a larger conductor diameter range impossible.

On the other hand, a wire stripper in which the centering jaws are replaced by a bush which cannot be moved radially and into which the conductor must be inserted by hand, and which also fits only for one operation, has already been proposed in U.S. Pat. No. 2,645,959 (Fuchs et al.). In that patent, axially sprung twisting jaws are arranged immediately next to the blade. However, they cannot serve as centering jaws because when the blade penetrates into the material, the springs are pressed back by the displacement of the material.

SUMMARY OF THE INVENTION

It is an object of the present invention to provide a wire stripping device of the type mentioned above that can be used universally for various dimensions and/or for multi-step wire stripping with the wire being stabilized immediately next to the blade, thereby preventing it from yielding during a cutting operation. It is also an object to provide a device for removing at least one layer from electrical or optical cables. It includes a stop for the fed-in conductor. The layers of the cable can be severed by at least one stripping blade that is rotatable around the axis of the conductor. The conductor is capable of being fixed in its axial position by clamping jaws that are arranged directly next to the blades. At least along a part of the radial travel of the blades, and, independent of the radial travel of the blades, centering jaws are movable and can be brought radially into position against the conductor by a positively acting actuating device, especially by means of a spring movement. The centering jaws are positively fixable in this position, especially by at least a first bevel surface.

It is another object to provide a device having centering jaws which can be moved radially so that the device can be used for different conductor diameters. It is another object to have blades which are radially movable independent of the centering jaws so that the device can be used for different incision depths which is an essential prerequisite for multi-step stripping operations. It is a further object to have a device where the centering jaws are held positively in cutting position, despite any unavoidable vibration of the conductor which may otherwise impede or prevent exact cutting. Another object is to have blades which are also automatically positively guided to assure cutting accuracy wherein the centering jaws are disposed just behind the blades so as to enable precise working, even with very short stripping lengths.

The holding surfaces of the centering jaws of the present invention are straight, or only slightly concave, so that the curvature does not obstruct conductors of especially small diameter from being fixed between the holding surfaces. It has been found that they must possibly be so narrow or axially offset from one another by the thickness of the material such that they accomplish their function even in the case of small conductor diameters.

Since a long length conductor has the tendency to roll out from between the centering jaws, in the direction of rotation, the holding surface of the centering jaws should first have a smooth consistency on one side, and then after the middle have, a toothed or rough consistency. The centering jaws should also rest lightly but unyieldingly against the surface of the conductor.

In place of the spring for the axial actuation of the centering jaws, magnetic, fluidic or gravitational operation of the jaws can be used. After the positive positioning against the conductor, positive retention of the position of the centering jaws on the surface of the conductor by a self-inhibiting wedge effect is assured by the taper angle of the tapered surfaces.

It is also expedient for the rotary drive and/or the axial actuation of the blade and of the centering jaws to be provided in unison. A rotary cut provides a clean and exact cut regardless of the condition of the blade, even with blades with small nicks. The design is simplified by providing a single drive for both parts. By rotation of the centering jaws, during the rotation of the blades, the jaws are always able to remain in the immediate vicinity of the blades, which advantageously provides a more accurate cut.

The distance from the cutting line of the blade to the side of the centering jaws facing the blade should expediently not exceed the diameter of the conductor, and should preferably be a maximum of 0.1 to 0.5 times the diameter of the conductor. The portion of the conductor involved in the cutting operation is thereby kept so short that it cannot bend, even if the blade should attempt to give way over a layer of shielding wires. This also assures that when the blade cuts into the material, the conductor does not yield and cannot bend, thereby preventing the blades from cutting to non-uniform depths relative to the axis of the conductor.

In the present invention the stop also has an important function. According to U.S. Pat. No. 3,881,374 no stop is provided at all; while in U.S. Pat. No. 2,645,959 the stop is adjustable relative to the blades. However, according to the present invention, when the conductor is introduced, it is always in the same position, for example in the zero position of the blades. The clamping jaws then grip the introduced conductor, the stop retracts and the blades and the centering jaws move into the preprogrammed stripping length position. The head assembly always travels only the absolutely necessary length, which can be shortened further if the zero position of the blades is in the middle between the end of the conductor and the longest stripping length.

For radial fixation of the centering jaws, at least one axially movable bevel surface, formed e.g. by a wedge or a cone which engages levers associated with the centering jaws, is provided. However, an axially symmetrical arrangement of several such bevel surfaces is preferred. This assures that the connection between the wedge surface and the lever is necessarily a positive one, if the respective part is to be guided against the surface of the conductor. Conversely, the lifting off of the wedge surface can be non-positive, insofar as the wedge surface is not formed by a positively acting groove in which a cam follower pin at the end of the arm engages.

In addition, a further wedge or the like can be provided for the actuation of the blade, especially when the actuating device is at least partially common to the centering jaws and the blade.

Since the centering jaws and the blade should be arranged as close to one another as possible, it is advantageous for the levers to be arranged in directly adjacent, preferably coaxial pivot bearings in order that they can be assigned paths of movement extending as parallel to one another as possible and so that they do not mutually obstruct the movement of one another. For this purpose, it can be beneficial for the centering jaws and blades to be arranged on levers that are arranged in planes which are about parallel, possibly coaxially in respective planes or surfaces which are curved correspondingly to one another. This parallelism can naturally be only approximate, because the two parts move relative to one another and in any case they will get out of complete parallelism with one another. Moreover, minor tolerances are naturally also possible.

BRIEF DESCRIPTION OF THE DRAWINGS

Further details of the invention are shown in connection with an embodiment shown schematically in the drawings, in which:

FIG. 1 is a schematic diagram of an example of an embodiment of the invention;

FIG. 2 illustrates the left part of FIG. 1 in the actuated position;

FIG. 5a is a cross section along the line 5a—5a'in FIG. 5b, and FIG. 5b is a cross section along the line 5b—5b'in FIG. 5a.

DETAILED DESCRIPTION OF THE PREFERRED EMBODIMENTS

Figure 3:
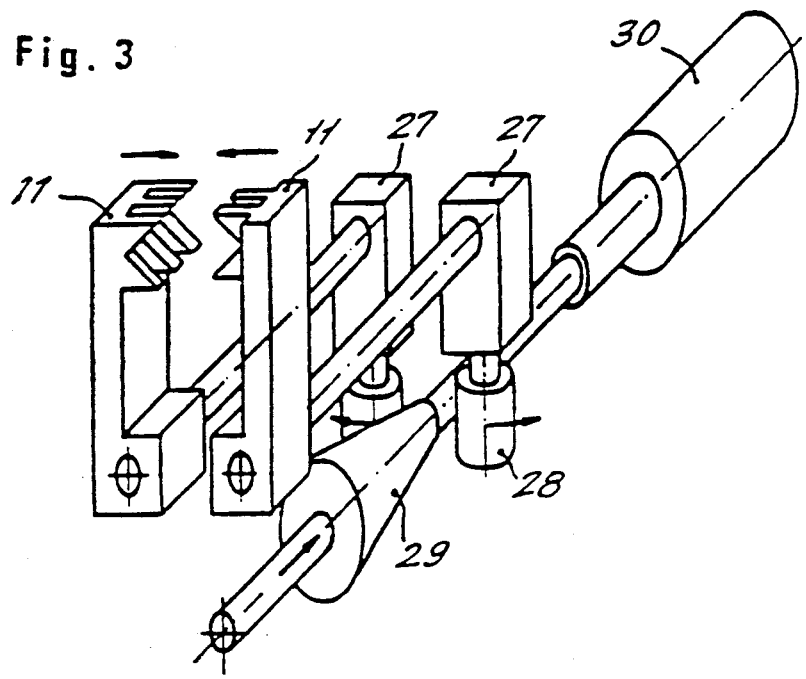
FIG. 3 is a perspective representation of a further detail of FIG. 1.

As shown in FIG. 1 a hollow shaft 2 which at its left end carries a stripping head assembly 3 is mounted in a case 1. The head assembly 3 includes a pair of opposing, two-armed rigid levers 5 and 6 which are mounted in pivot bearings 4,4'.

The levers 5 are supported at their end at the right by skids which ride on an actuation bevel. The actuation bevel comprises a wedge 17 (shown in dashed lines) which is movable axially and coaxially to hollow shaft 2. The right ends of the levers 6 rest with cam follower rollers 7 against a similar double wedge or truncated cone 13. The skid or the roller rests against these bevel surfaces either under their own weight, or under the action of a spring, not shown. Slots extend along the respective bevel surfaces in which cam follower pins or rollers engage from the side, thereby positively guiding the levers 5,6, or only one may be used. In this embodiment of the invention, the pivot bearings 4' are located distant from the skids which ride on the bevel surface of the wedge 17, here about half-way to the centering jaws 9. The advantageous leverage characteristics due to this arrangement, along with the substantial rigidity of the levers 5, the friction of the skids on the bevel surface of the wedge 17, and the small angle of inclination of the bevel surface, inhibit any radially outward force on the centering jaws 9 from causing any corresponding movement of the wedge 17.

The device is controlled by a digital controller 72 with a sequence of selector wheels 73 for adjusting the stripping lengths and severing depths, and a sequence of selector wheels 74 for the memory addresses of these values, and a selector wheel 75 for adjusting the desired number of insulation stripping steps. The centering jaws 9 and the blades 8 could also be positioned by means of DC motors with decoders instead of a potentiometer, or by means of stepping motors.

In order to bring the centering jaws 9 and the blades 8 out of their positions shown in FIG. 1 and into those shown in FIG. 2, an actuation device for the wedges 13, 17 including a thrust tube 12 is provided. The right end of the actuation device is mounted in a thrust bearing 34 connected with the inside thread segment 14. A spindle 15 which can be driven by a motor 16 is screwed into the inside thread in order to be able to move the inside thread segment 14 along the spindle 15, to thereby move the thrust tube 12 axially.

The wedge 17 is also actuated by the thrust tube 12. The double wedge 13 expediently has one or two recesses extending in the axial direction in which the wedge 17 can be moved. However, since the centering jaws 9 need only bear against the insulated surface of the conductor 10, while the blades 8 must penetrate into the layer of insulation and possibly also a shield, these two parts 8,9 must be able to move relative to one another in the radial direction. It is therefore expedient for the wedge 17 to be actuated positively. This is recommended to be carried out independently of the common actuation and also in view of tolerances of the soft insulation surface of the conductor 10.

For this purpose, the thrust tube 12 has a collar 35 against which one end of a spring 18 bears. The other end of the spring bears against flange 36 of the wedge 17. Conversely, the thrust tube 12 is rigidly connected with the double wedge 13, so that it can be moved into a preadjusted position, while the centering jaws 9 have already been moved into position against the surface of the insulation of conductor 10 which thereby resists further axial movement of the wedge 17. The differential movement is compensated by the compression of the spring 18. In place of the spring 18, any compensating device producing positive positioning of the centering jaws 9 on the insulated surface of the conductor 10, for example an air cushion consisting of a cylinder-piston assembly, can be used.

When the thrust tube 12 is moved to the left by the drive elements 14–16, it is apparent that the bevel surfaces of the wedges 13,17 will have a positive drive action upon the levers 5,6, which thereby pivot out of the positions shown in FIG. 1 into the ones shown in FIG. 2. This is accomplished by the 2-arm design of the levers 5,6. Otherwise, it would only be possible to accomplish one positive action movement by the action of a correspondingly rated spring, or a positive action movement provided by a groove or slot guide with a greater space requirement.

In FIG. 1 another drive with a motor 25 is shown which, via a gearwheel pair 24, rotates the shaft 2. This thereby causes the head assembly 3 to rotate, so as to be able to execute a rotational cut through the insulation or the shield of the conductor 10. A single rotation of the shaft 2 is sufficient, even though it may possibly be desirable to interrupt the rotational movement while the middle layer is being stripped.

As shown in FIG. 3, the clamping jaws 11 are mounted on levers 27 which are connected to cam follower rollers 28. The clamping jaws 11 are actuated by an electromagnet 30. Wedge-shaped cam surfaces are provided on a cone 29, and the rollers 28 press against the surfaces under the action of a force-application device, such as a pull spring tensioned between them. When the cone 29 is attracted by the magnet 30, the larger diameter portion of the cone 29 will move between the two rollers 28 and force them apart as shown by the arrows in FIG. 3, while moving jaws 11 together. The opposed movement of the clamping jaws 11 takes place positively under the pressure of the cone 29, whereas the opening movement of the clamping jaws occurs non-positively under the action of the force-application device or spring (not shown). In place of the magnet 30 any other motorized drive can naturally also be used, and may be in the form of a spindle which can be driven by a motor.

The device according to the present invention functions as follows:

The desired stripping lengths and severing depths are stored in digital controller 72. They can be called up by insertion of the conductor 10 up to the stop 20 between the opened clamping jaws 11. Through the rod 19, which extends along the axis of rotation of the device, the stop 20 moves the end piece 22 such that its edge 80 is scanned by sensor 23. The signal of the sensor 23 is processed in the digital controller 72, and causes the following process steps to occur:

1. The current to electromagnet 30 is turned on. This pulls the cone 29 to cause the clamping jaws 11 to close, via the cone 29, the rollers 28 and the levers 27 (FIG. 3). Because of the prismatic shape of the clamping surfaces of the jaws 11, the conductor 10 is clamped and centered precisely along the axis of rotation.

2. The stop 20 is then retracted by the rod 19. The rod 19 is drawn to the right, as seen in FIG. 1, by an end piece 22 which moves into the immersion magnets 21 to the right by actuation of said magnets 21, whereby the stop moves out of the working space.

3. The motor 26 is then started, whereby the cutting line of the blades 8 is brought via the spindle 33, the frame 66, the thrust bearing 47, the hollow shaft 2 and the lever 6, into the first stripping position 37. This position is monitored by potentiometer 71.

4. After this position is reached, the current to motor 25 is turned on. This sets in rotation the head assembly 3 with the blades 8 and the centering jaws 9 via the gearwheel pair 24.

5. At the same time, motor 16 is started so that the blades 8 are brought into the preprogrammed cutting depth via parts 4,6,7,12-15 and the thrust bearing 34. In this closing process, the centering jaws 9 also move via 5,4', 17,18,35 and 36 to the surface of the conductor, and thereby center the conductor 10 in the immediate area of the future cut. On the first slight resistance occuring from the contact of the centering jaws 9 with the surface of the conductor 10, the axial movement of the wedge 17 is braked by the lever 5. The spring 18 is compressed because the thrust tube 12 is still moving, until the preadjusted cutting depth in the conductor 10 is attained (FIG. 2). This position is monitored by potentiometer 70. By the rotation of blades 8, the layers to be stripped are severed circularly.

The contact of the centering jaws 9 and the concentric gripping of the conductor 10, directly next to the blades 8, also assures that during stripping, the conductor 10 cannot be cut to an equal depth due to vibrations or due to a blade jumping over shielding residues, i.e. there will not be a deeper cut by one blade of the blade pair, relative to the axis, than by the other blade.

6. After the preadjusted severing depth is reached, the motor 26 is controlled by the digital controller 72 to retract the head assembly 3 in the opposite axial direction, thereby pulling off the severed layer, from the conductor.

7. The blades 8 and the centering jaws 9 are then opened again in the reverse sense by the control of the motor 16.

8. The process steps 3 to 7 described above are repeated for each planned stripping operation.

9. As a final step the magnets 21 and 30 are turned off, which opens the clamping jaws 11. The conductor 10 is released. The stop 20 jumps back, caused by the force of a spring not shown, until the edge 80 of the end piece 22 is again resting on the surface 81. The device is thereby made ready for the next stripping operation.

After the desired program is called up by the sequence of selector wheels 74, the head assembly 3 along with the blades 8 and the stop 20, automatically goes into the starting position as given by the maximum stripping length x of the program and the distance (which in FIG. 1 is designated as y) between the centering jaw 9 and the clamping jaws 11. This distance ensured that upon closing, the centering jaws 9 do not touch the clamping jaws 11, and also that the stop 20 is always within the blade line. This arrangement assures that the stripping head assembly travels only the absolutely necessary distance in the axial direction, which, with regard to wear and working speed, is of great significance.

Figure 4:
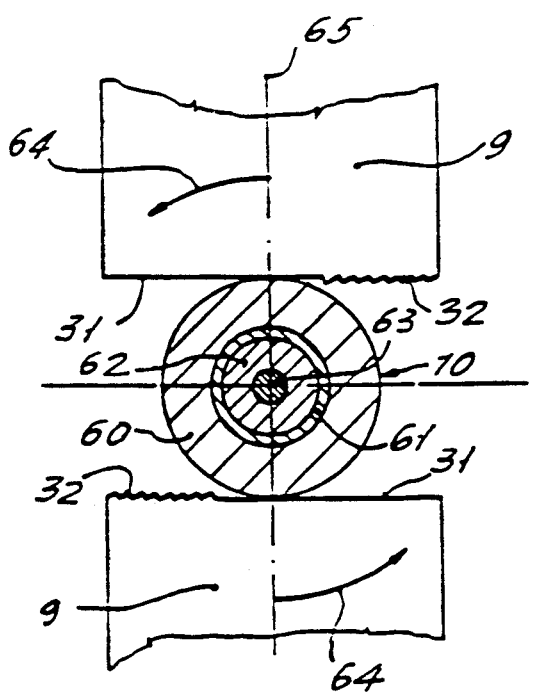
FIG. 4 is an end view of the centering jaws, with a cross section through a coaxial cable to be stripped.

The action of the centering jaws 9 should expediently not only extend to the center of the conductor 10 but to the middle from above and below (referring to FIG. 1). In rotational cutting lateral centering is also desired. However, since conductors of different diameters are to be stripped, for many applications it would not suffice to provide the centering jaws 9 with prismatic surfaces analogous to the clamping jaws (of FIG. 3). Therefore, a preferred cutting embodiment is used as shown in FIG. 4. The conductor 10 has an outer layer of insulation 60, shielding 61 and a dielectric 62 which enclose the wire 63. Since the blades 8 are situated essentially parallel to the centering jaws 9, during the execution of the rotational cut, the conductor can easily roll cut to the side between the surfaces 31,32 of the centering jaws 9 unless additional counteracting measures are taken. This undesired rolling can be avoided by providing the gripping surfaces 31,32 in the direction of rotation (64) of the centering jaws 9, with an essentially smooth surface section 31 at the front, which is followed by a rough, preferably serrated surface section 32. The teeth extend transverse to the direction of rotation 64 or parallel to the longitudinal axis of the conductor 10. It has proven expedient to extend the smooth section 31 from one side of the centering jaw 9 to beyond its longitudinal axis or beyond a plane defined by this axis 65 and the longitudinal axis of the conductor 10. The conductor 10 is thereby held in the centered condition shown by the smooth surface 31, but gripped by the teeth of section 32 as soon as it exhibits even the slightest tendency to retreat or roll away to the side.

Figure 6:
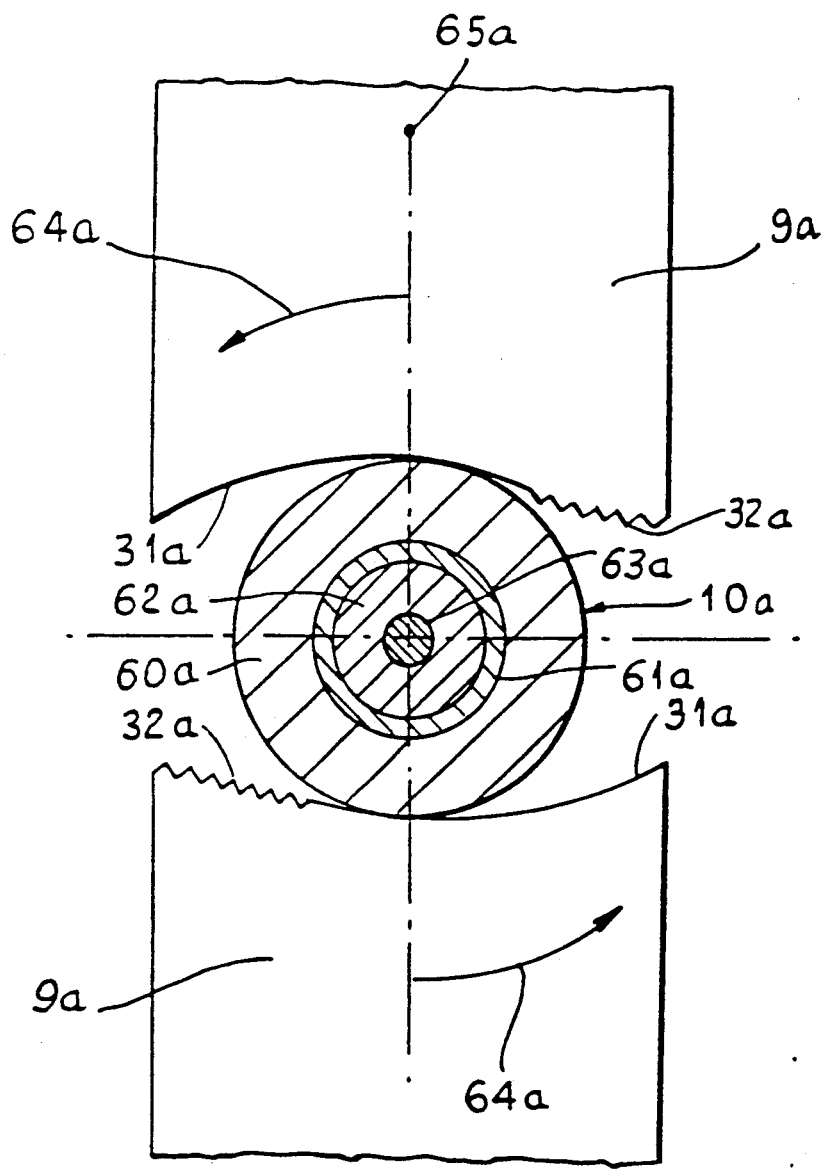
FIG. 6 is an end view of the centering jaws according to an alternate embodiment, in which the centering jaws have a concavely curved shape for partially surrounding the cable.

FIG. 6 shows an alternate embodiment of the invention in which the centering jaws have a concavely curved shape for partially surrounding the cable to be stripped. Other than the shape of the jaws, the embodiment of FIG. 6 is similar to that of FIG. 4. Therefore, the operation of the FIG. 6 embodiment will be understood in view of the preceding description relative to FIG. 4.

Figure 5A:
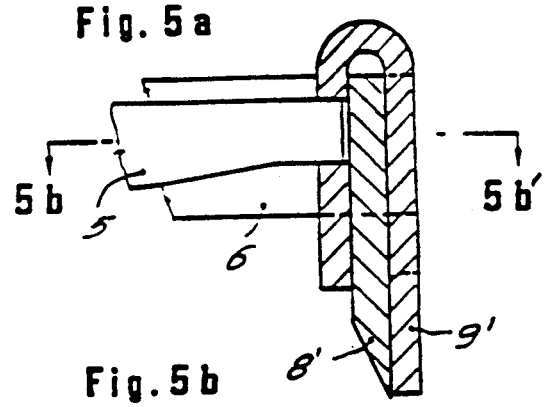
FIGS. 5a and 5b show a special embodiment of the combination of a blade and a centering jaw according to the present invention where
Figure 5B:
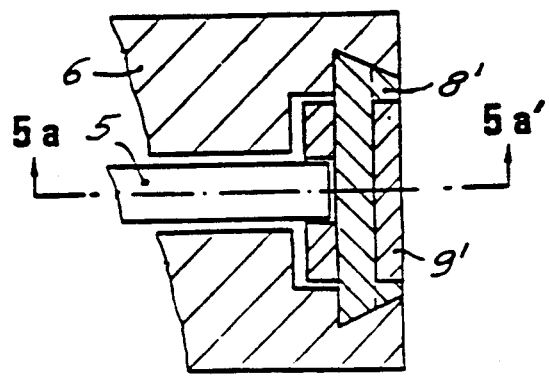

As shown in FIG. 5b, the blade 8' has a lateral cross-sectional u-shape, with the exception of the cutting edge. The u-shaped blade 8' enclasps one leg of centering jaw 9, as shown in FIG. 5b. Jaw 9' is also u-shaped, but in the longitudional cross-section (top-to-bottom as seen in FIG. 5a). The other leg of the blade 8' is affixed to the lever 5 as shown in FIG. 5b. The blade 8' is held by its outer dovetail shape in lever 6. The centering jaw 9' slides into the opening in blade 8'.

What is claimed is:

1. A device for removing at least two layers from a cable, comprising
   frame means;
   blade means mounted on said frame means;
   first actuating means for rotating said blade means around the axis of the cable, enabling the blade means to sever said at least two layers to be removed;
   second actuating means for moving the blade means radially toward the cable into at least two different preselectable radial positions with respect to said cable, for contacting said at least two layers of the cable to be removed; and
   electronic means for storing said at least two different preselectable radial positions and controlling at least said second actuating means.

2. A device as in claim 1, further comprising third actuating means for moving said blade means axially with respect to the cable to at least two different preselectable axial positions along said cable.

3. A device as in claim 2, wherein said electronic means stores said at least two different preselectable axial positions.

4. A device as in claim 3, wherein said electronic means controls said third actuating means.

5. A device as in claim 4, wherein said electronic means is operable for controlling said first, second and third actuating means for removing end portions of at least two layers from a cable, by causing said blade means to cut said cable at two respective axial locations and to two respective depths within said cable.

6. A device as in claim 1, further comprising clamping means mounted on the frame means for clamping the cable in an axial position with a free end of the cable at a predetermined terminal position relative to the frame means.

7. A device as in claim 1, further comprising centering means for centering the cable with respect to the blade means.

8. A device as in claim 7, wherein said centering means engages the cable at a location axially near the blade means.

9. A device as in claim 8, wherein said second actuating means moves the centering means radially into engagement with the cable for radially positioning the cable with respect to the blade means.

10. A device as in claim 9, wherein said second actuating means comprises a single drive motor which causes both said centering means and said blade means to move radially toward the cable.

11. A device as in claim 10, wherein said centering means comprises at least a pair of opposed centering jaws.

12. A device as in claim 10, wherein said second actuating means further includes at least one spring which receives a force from said drive motor and applies a force to urge said centering means radially toward said cable.

13. A device as in claim 12, wherein said centering means comprises at least a pair of opposed centering jaws.

14. A device as in claim 9, wherein said second actuating means moves said centering means and blade means so that they engage the cable substantially simultaneously.

15. A device as in claim 14, wherein said electronic means controls said second actuating means to move said centering means and blade means to engage the cable substantially simultaneously.

16. A device as in claim 14, wherein said second actuating means comprises a bevel surface spaced in axial direction of the cable from the blade means, and follower means attached to the blade means and engaging said bevel surface, so that upon movement of the bevel surface in axial direction of the cable, the blade means is moved in radial direction relatively to the cable, wherein the bevel surface is supported on said frame means and is movable to at least three different positions with respect to the free end of the cable.

17. A device as in claim 16, wherein said second actuating means further comprises a shaft extending in the axial direction of the cable from a first location on said frame means spaced from the centering means, and comprises shaft drive means at said first location connected to said shaft.

18. A device as in claim 17, wherein said centering means is linked to said shaft so that movement of said shaft by said shaft drive means causes said centering means to engage said cable.

19. A device as in claim 17, wherein said centering means is biased by a spring.

20. A device as in claim 7, wherein said centering means is linked to said blade means so as to move axially therewith.

21. A device as in claim 20, wherein said centering means is linked to said blade means so as to move at least in part radially therewith, so that said centering means and blade means move radially and contact said cable substantially simultaneously, before said blade means sever said layers of said cable.

22. A device as in claim 7, wherein said centering means is linked to said blade means so that said centering means and blade means move radially and contact said cable substantially simultaneously, before said blade means sever said layers of said cable.

23. A device as in claim 7, wherein said second actuating means includes spring means with at least one spring which urges said centering means radially toward said cable.

24. A device as in claim 12, wherein said at least one spring has first and second ends, the first end being linked to said second actuating means so as to move in response to movement of said second actuating means, and the second end of said spring urging said bevel surface axially with respect to said cable in order to urge said centering means radially toward said cable.

25. A device as in claim 23, wherein said centering means comprises at least a pair of opposed centering jaws.

26. A device as in claim 2, further comprising carriage means mounted on said frame means so as to be movable in axial direction with respect to said cable; said blade means being mounted on said carriage means; whereby said third actuating means moves said blade means axially with respect to said cable.

27. A device as in claim 26, wherein said clamping means is mounted on said frame means.

28. A device as in claim 26, wherein said centering means is mounted on said carriage means.

29. A device as in claim 28, wherein said third actuating means automatically moves said carriage means axially into at least two different preselectable positions, with respect to the cable and said frame means, thereby to establish at least two respective lengths of said at least two layers which are to be removed from the cable; and said electronic means controls the second and third actuating means, to control automatically the movement of the blade means and centering means toward all of said preselectable radial and axial positions with respect to the cable.

30. A device as in claim 26, further comprising input means on said frame means for entering axial and radial position data into said electronic means, and sensing means to locate the axial position of said carriage means; said sensing means being connected to said electronic means.

31. A device for removing at least two layers from a cable, comprising
frame means;
blade means mounted on said frame means;
actuating means for rotating said blade means around the axis of the cable, enabling the blade means to sever said at least two layers to be removed, and for moving the blade means radially toward the cable into at least two different preselectable radial positions with respect to said cable, for contacting said at least two layers of the cable to be removed; and
electronic means for storing said at least two different preselectable radial positions and controlling said actuating means.

* * * * *